United States Patent Office 2,808,938
Patented Oct. 8, 1957

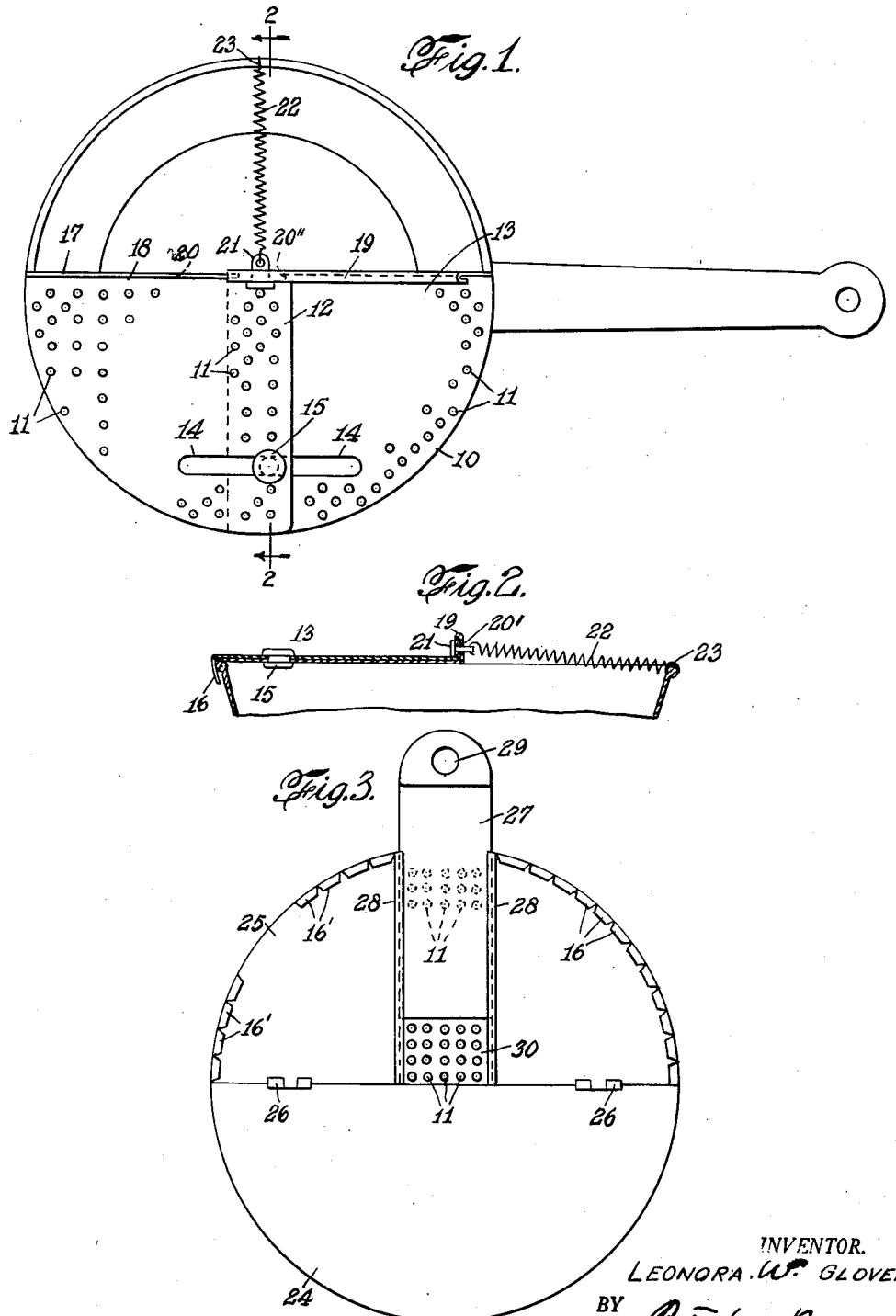

2,808,938
HOUSEHOLD ARTICLES
Leonora W. Glover, New York, N. Y.
Application July 30, 1953, Serial No. 371,231
1 Claim. (Cl. 210—469)

This invention relates to new and useful improvements in household articles, and it has more especially for its purpose to provide a strainer, or sieve, for use by housewives during cooking and preparation of food, such as spaghetti, peas, etc., as it will facilitate the work incidental to same in a very considerable manner, as will be apparent from the construction of the device, hereinafter set forth.

With the above and other objects in view, this invention consists of the novel features of construction, combination and arrangement of parts, hereinafter fully described, claimed and illustrated in the accompanying drawing forming part of this application, and in which similar characters of reference indicate corresponding parts in all views, and in which:

Figure 1 is an elevational top plan view of my device.

Figure 2 is a transverse sectional view, taken on the line 2—2 in Figure 1; while Figure 3 is a view similar to Figure 1, but showing a modification of my said device; as seen from below.

Referring more particularly to the drawing, the numeral 10 indicates a sieve provided with apertures 11 in its entire surface (some of which have been shown).

The sieve has two parts 12 and 13, which are adapted by a telescoping movement to overlap each other, according to the size (circumference) of the cooking utensil with which it is to be used.

In order to secure said parts 12 and 13 together and during their telescoping movement, slots 14, 14 are formed in both parts 12 and 13, while a stud 15 mounted through said slots secures said parts relatively together in their adjusted position.

One of the said parts 12 and 13 is formed with depending split flanges 16 along its entire periphery, as may be seen in Figure 3, which in this respect is similar to Figure 1, while the other part of the parts 12 and 13 has similarly depending flanges 16' arranged at intervals in order, when in extended position, to accommodate the size of utensil to which the strainer or sieve may be applied.

The sieve is formed with a straight diametrical edge 17, of which the edge portion of the part 12 is upwardly bent, as at 18 and formed with a longitudinal slot 21, while the edge portion 19 of the part 13 is bent upwardly upon itself in order to overlap and telescope upon the edge portion 18.

The telescoping edge portion 19 is formed with a longitudinal slot 20' therein adapted to slidably receive the member 21; a spring 22 is attached to the latter in any convenient manner; said spring terminates in a hook portion 23 adapted to engage the opposite edge of the utensil upon which the sieve is mounted, so as to secure the latter in position during manipulation thereof.

The purpose of the relative arrangement of the member 21 to the spring 22 for movement in the slots 20 and 20' is to be able to secure the hook 23 to the apex of the utensil, upon which the sieve is placed, without regard to the extension of the two sieve parts 12 and 13.

In the Figure 3 is shown a complete non-extendable cover for a utensil.

In this cover, one half 24 is without apertures, or perforations, while the other half 25, which is hingedly connected to the former, as at 26, is formed with apertures 11 in a restricted area thereof, as shown.

A plate 27 is slidably mounted upon and over said restricted area 30, by means of guides 28 secured to the half cover 25.

Said plate 27 is provided with an opening 29 therein, and may, when retracted from the perforations 11, be used as a handle in manipulating the device relative to the cooking utensil.

The half cover 25 is also in this modification provided with split depending flanges, which, however, in this instance may extend all around the periphery, as this cover is not extendable.

The left side of the flanges shown in Figure 3 applies only to Figure 1, in which the cover is extendable.

It is obvious that changes may be made in the form, construction and arrangement of the several parts, as shown, within the scope of the appended claims, without departing from the spirit of the invention, and I do not, therefore, wish to limit myself to the exact construction shown and described herein.

What I claim as new, and desire to secure by Letters Patent of the United States, is:

In a device of the class described, a circular strainer formed with perforations one half of said strainer being divided into two symmetrically telescoping sections, the latter being formed with slots therein, and a stud mounted in said slots and adapted to secure said sections in a relatively adjusted position, depending split flanges around the periphery of one of said sections, and depending split flanges arranged at intervals around the periphery of the other section, a diametrical edge across said circular strainer, the edge of one section being upwardly bent, and the edge of the other section being bent upon itself to telescope upon the first edge, the latter having a slot adapted to receive a member, a spring having one end attached to said member and upon the other end a hook for attachment to the apex of a utensil.

References Cited in the file of this patent
UNITED STATES PATENTS

| | | |
|---|---|---|
| 453,081 | Heimbaugh | May 26, 1891 |
| 1,241,448 | Sherman | Sept. 25, 1917 |
| 1,781,995 | Alexander | Nov. 18, 1930 |
| 1,953,338 | Claire | Apr. 3, 1934 |
| 2,398,978 | Udell | Apr. 23, 1946 |
| 2,463,209 | Serkes | Mar. 1, 1949 |

FOREIGN PATENTS

| | | |
|---|---|---|
| 372,800 | Germany | Apr. 3, 1923 |